H. P. BALL.
BROILER.
APPLICATION FILED JULY 11, 1913.

1,181,722.

Patented May 2, 1916.
3 SHEETS—SHEET 1.

Witnesses:
Marcus L. Byng.
J. Ellis Glen

Inventor:
Henry Price Ball
by Albert H. Davis
His Attorney

H. P. BALL.
BROILER.
APPLICATION FILED JULY 11, 1913.

1,181,722.

Patented May 2, 1916.
3 SHEETS—SHEET 2.

Witnesses:

Inventor:
Henry Price Ball
by
His Attorney

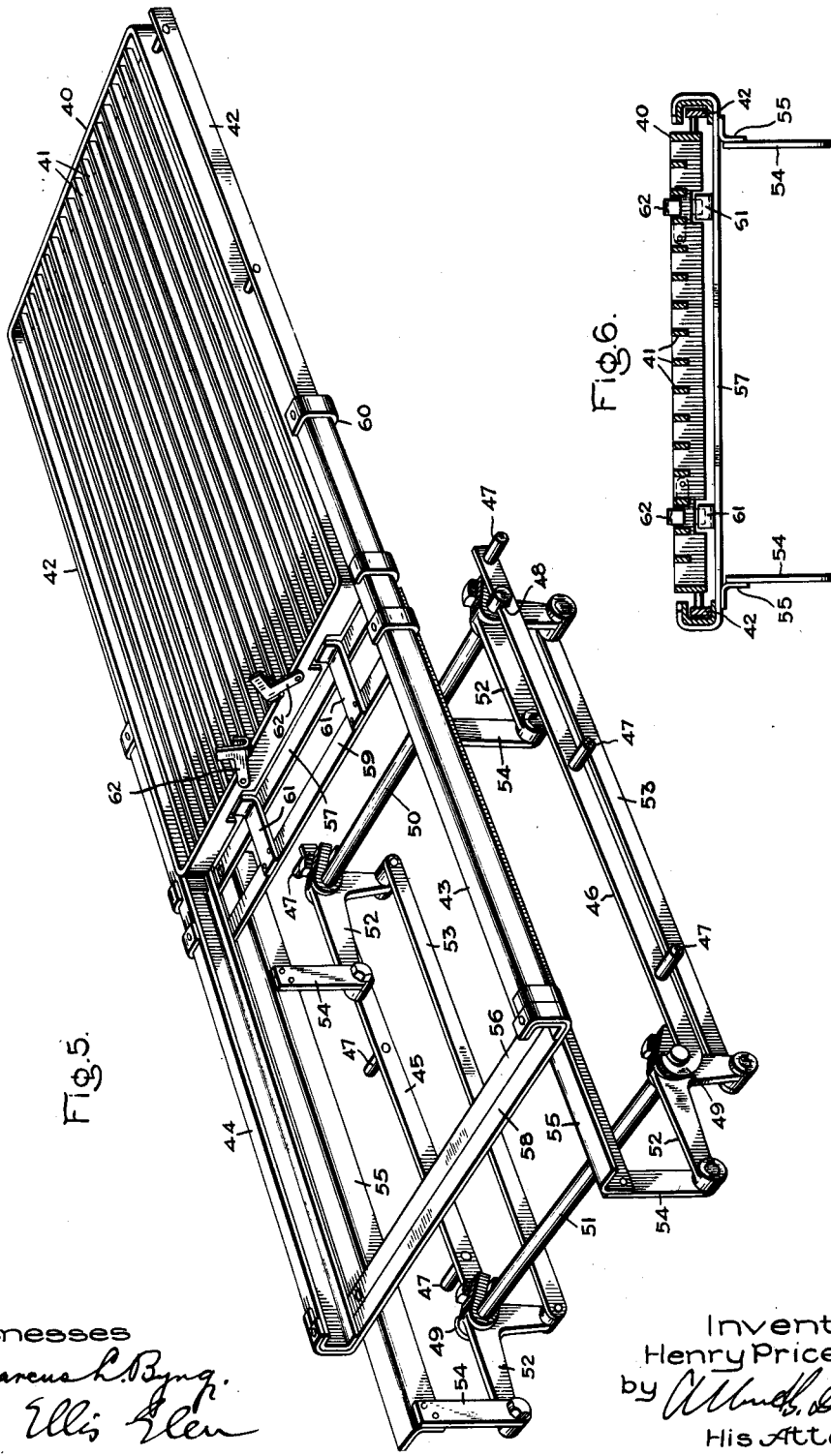

UNITED STATES PATENT OFFICE.

HENRY PRICE BALL, OF PITTSFIELD, MASSACHUSETTS, ASSIGNOR TO GENERAL ELECTRIC COMPANY, A CORPORATION OF NEW YORK.

BROILER.

1,181,722.     Specification of Letters Patent.     Patented May 2, 1916.

Application filed July 11, 1913. Serial No. 778,547.

*To all whom it may concern:*

Be it known that I, HENRY PRICE BALL, a citizen of the United States, residing at Pittsfield, in the county of Berkshire, State of Massachusetts, have invented certain new and useful Improvements in Broilers, of which the following is a specification.

My invention, relates to cooking devices and more particularly to electric ovens such as are used as broilers although the novel features of my invention might be used in connection with ovens for various purposes.

Ovens of the type to which my invention relates are usually constructed of walls having high heat insulating properties and owing to the intense heat given off by the electric unit it is found necessary to carry on the cooking operation with the oven door partially or wholly open. In fact, if the door were closed while the current was turned on, the heat would become so intense as to not only burn any article which might be cooking but to probably do material damage to the oven itself. In order to guard against this contingency it has been proposed to so arrange the switch controlling the supply of electric energy to the heating unit that it could only be closed when the door was at least partially open and so that it would be automatically opened if the door were closed while the switch was closed.

One of the objects of my invention is to provide a novel arrangement of parts for accomplishing the above described purpose.

Another object is to provide an oven wherein the support for the article to be heated can be adjusted toward and away from the heating unit.

Further objects of my invention will appear from and be pointed out in the course of this specification, wherein I have illustrated and described a structure embodying the various features of novelty and combination of parts which comprise my invention.

Figure 1:
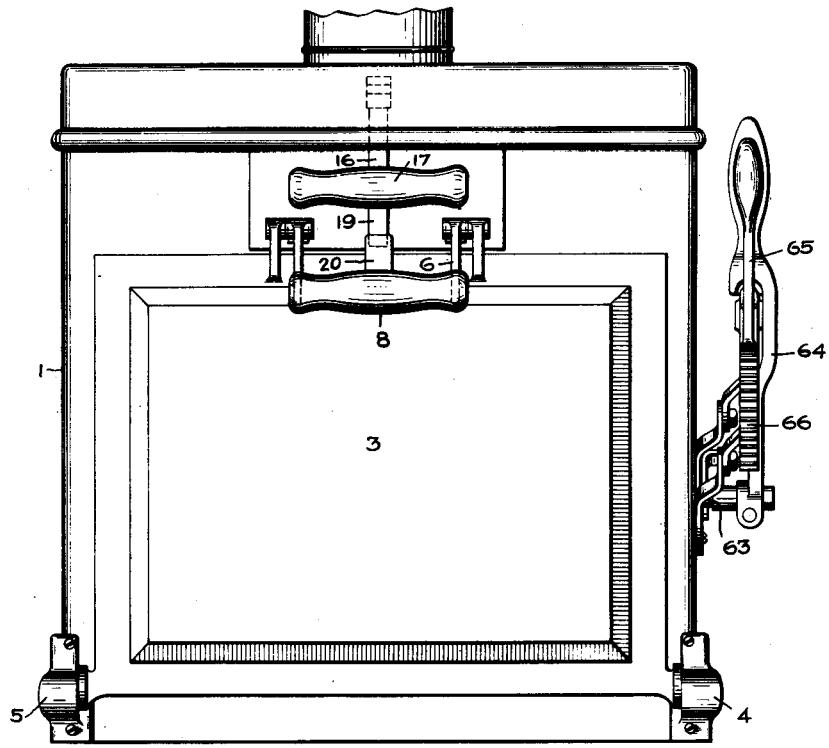
Figure 2:
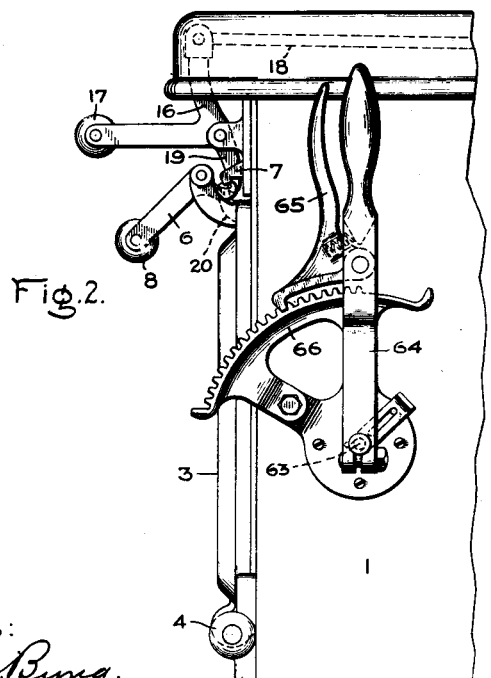
Figure 3:
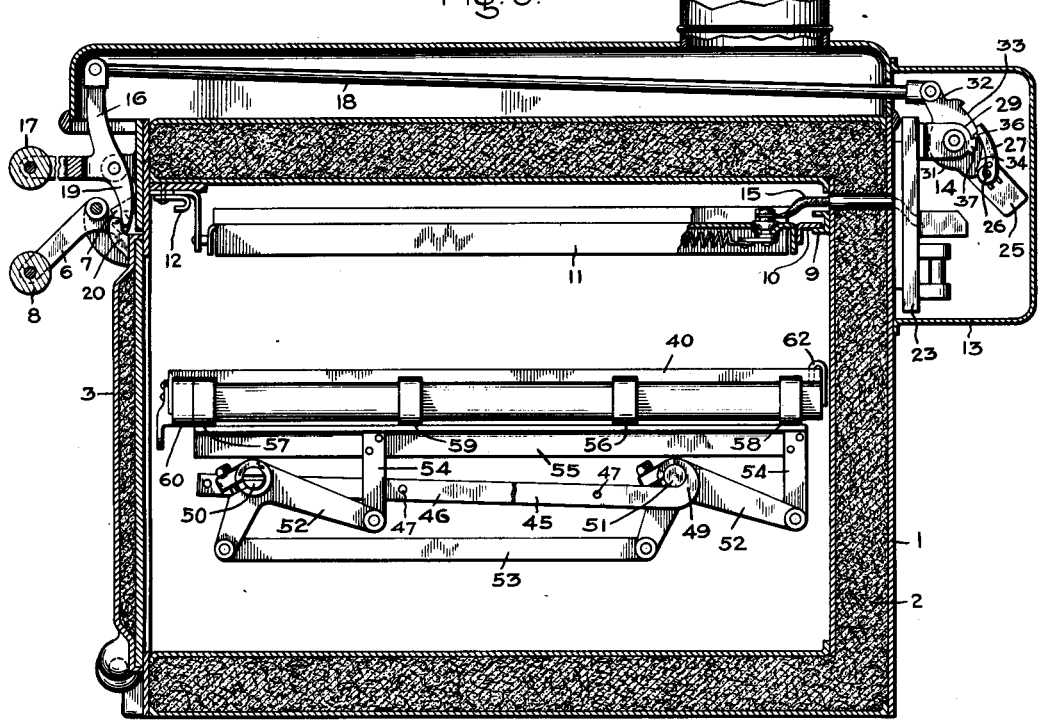
Figure 4:
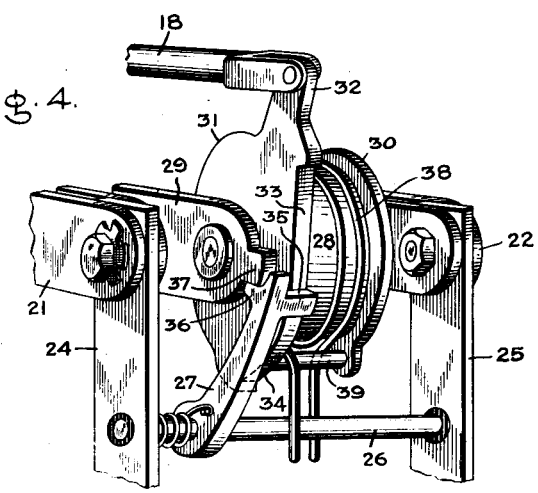

Referring to the drawing, Figure 1 is a front view of my oven; Fig. 2 is a fragmentary side view thereof; Fig. 3 is a longitudinal section; Fig. 4 is a detail perspective view of a switch; Fig. 5 is a perspective view of the adjustable support and its carrying frame, the parts being shown removed from the oven. Fig. 6 is a detail sectional view through the support and its carrying frame.

The oven 1 is shown as comprising a double walled receptacle having suitable heat insulating material 2 between the walls as is usual in this class of device. The door 3 is suitably hinged at the lower portion as shown at 4 and 5 to open downwardly and at its top carries a pivoted latch 6 which coöperates with the catch 7 fastened above the top of the doorway.

8 is a handle used for releasing the latch 6. The door is hinged at the bottom so that the operator while holding the door partially open can readily see how the cooking operation is proceeding.

Fixed to the back of the oven and preferably near the top thereof is a channel shaped support 9 within which sets the horizontal projection or projections 10 carried by the heating unit 11. This heating unit is here illustrated as being an ordinary resistance wire carried in an inverted flanged casing adapted to reflect the heat downward and supported at the front by releasable catches 12, only one of which shows in the drawing. By releasing these catches the heating unit is quickly and easily removed for repair or for cleaning.

Although I have illustrated an electrical heating unit of specific form it is to be understood that my invention is not limited to this type of heating unit but that I may use other types if desired.

Mounted within the hood 13 at the back of the oven is the means for controlling the supply of energy to the heating unit which in this instance is a snap switch 14 connected by leads 15 to the heating unit. This switch is operated by means of a bell crank lever 16 pivoted above the doorway and adjacent to handle 8 as best shown in Fig. 1. One arm of the bell crank lever carries a handle 17 while the other arm is connected to switch 14 by means of rod 18. Carried by the lever 16 is a projection 19 which takes behind a nose 20 on the upper portion of the door. With the door closed as shown in Fig. 3 the switch is open and the bell crank lever 16 cannot be operated to close the same unless the door is first lowered to move nose 20 away from projection 19. Likewise the door cannot be closed unless bell-crank lever 16 is first operated to open the switch. If attempt is made to close the door when the switch is closed obviously the switch will be operated through the engagement of nose 20 with the projection 19. The object of this arrangement as before stated is to provide against any possibility of the heating unit being left operative while the door is closed. By arranging the handles for the door and switch adjacent each other as shown, the same are convenient for operation, it being possible to control the switch with the same hand which is being used to hold the door.

The specific form of snap switch which I have illustrated is shown in Figs. 3 and 4 as comprising two pairs of projecting standards 21 and 22 supported on base plate 23 and carrying switch blades 24 and 25. A rod 26 carrying spring pressed pawl 27 rigidly connects the switch blades 24 and 25, the rod 26 being insulated from the switch blades as shown. 28 is a drum journaled on supports 29 projecting from the base plate 23 and having upon each side thereof the flanges 30 and 31. The flange 31 is shown as having a projecting ear 32 to which operating rod 18 is connected and as also carrying two cam surfaces 33 and 34 which coöperate with a lug 35 projecting from pawl 27. The pawl 27 carries also a lug 36 which engages upon one side or the other of a projection 37 on the end of the adjacent support 29, the pawl being biased by its spring for such engagement. Wound on the drum 28 is a spring 38 the two ends of which project upon opposite sides of a rod 39 connected to the two flanges 30 and 31 and of rod 26.

The operation of the switch is as follows: With the switch closed the parts would occupy the positions shown in Fig. 4. If now connecting rod 18 is forced to the left the drum will be turned carrying with it rod 39. The switch blades are prevented from moving by reason of pawl 27 engaging under projection 37 and as a consequence spring 38 will be put under tension, one end thereof being moved by rod 39 and the other end being held by rod 26. After a limited movement cam 34 will force pawl 27 from engagement with projection 37 and the blades 24 and 25 being now released the spring 38 will quickly snap them to open position as shown in Fig. 3. To close the switch the action will be the same only in a reverse direction the cam 33 coming into play.

Referring now particularly to Fig. 5 the support for the article to be heated is shown at 40 as comprising a rectangular frame provided with longitudinal strips 41 and guide rails 42, one on each side. These guide rails slide in the U-shaped channel bars 43 and 44, which in connection with other parts to be described, form my supporting frame. 45 and 46 are two supporting strips extending longitudinally of the oven and attached to the sides thereof by bolts or rivets 47. These supporting strips are each provided with a slot 48 at the front end and terminate in a hook 49 at the rear. 50 and 51 are two rods extending crosswise of the oven and adapted to slide upon the strips 45 and 46 and to engage and be held in place by the hooks 49 and slots 48. Attached adjacent the ends of each of these rods 50 and 51 are bell crank levers 52 to the downwardly projecting arm of which are pivoted the longitudinal strips 53. Each horizontal arm of the bell crank levers 52 carries a pivoted arm 54, these arms supporting longitudinally extending angle irons 55. Extending crosswise of and attached to the angle irons 55 are two guiding brackets 56 and 57 and on these guiding brackets the channel shaped bars 43 and 44 are adapted to slide. The channel shaped bars 43 and 44 are connected to each other by cross brackets 58, 59 and 60 spaced along the same, the cross bracket 58 coöperating with guiding bracket 56 to limit the forward sliding movement of the channel bars 43 and 44 and the cross bracket 60 coöperating with guiding bracket 57 to limit the rearward movement, (see Fig. 3). Carried by cross bracket 59 are two stops 61 which coöperate with pivoted catches 62 to limit the forward movement of support 40. By moving these catches to the position shown in Fig. 5 it will be seen that the support can be entirely removed from its carrying frame. Extending through an opening in the side of the oven is a short shaft 63 adapted to engage with the end of rod 50. This shaft 63 carries an operating handle 64 as shown in Figs. 1 and 2, the handle having a pivoted latch 65 coöperating with toothed segment 66 to hold or lock the same in any desired position. By moving handle 64 forward and backward rod 50 will be oscillated to raise and lower support 40 as will be readily understood from Fig. 5. By this means the support can be adjusted with relation to the heating unit as desired. The entire support and carrying frame can be removed from the oven for cleaning or repairs by lifting rod 50 from slots 48 and sliding the parts forward, rod 51 riding on supporting strips 45 and 46.

The arranging of the heating unit at the top of the oven and above the support is of advantage in that it protects the unit from any drippings from articles being cooked or any materials which might be spilled. By arranging the support as shown it can readily be pulled partially through the oven door for turning or removing articles that are cooking.

What I claim as new and desire to secure by Letters Patent of the United States, is:—

1. The combination of a stationary oven, a heating unit, a frame adjustable toward and away from said heating unit mounted in said oven and a support slidably engaging with said frame.

2. The combination of an oven, a heating unit, a shaft and a frame in said oven, operative connections between said shaft and frame whereby oscillations of said shaft will adjust the relation of the frame to the heating unit and a support slidably engaging and carried by said frame.

3. The combination of an oven, a heating unit, a shaft and a frame in said oven, operative connections between said shaft and frame whereby oscillations of said shaft will adjust the relation of the frame to the heating unit, a support slidably engaging and carried by said frame and means for limiting the sliding movement of the support.

4. In combination, an oven having an opening, a heating unit mounted in the oven, a frame mounted below said heating unit, a support carried by said frame and slidable through the opening and means for limiting the sliding movement of the support.

In witness whereof, I have hereunto set my hand this 2nd day of July, 1913.

HENRY PRICE BALL.

Witnesses:
H. B. DAVERIN,
M. J. REYNOLDS.